US011113243B2

(12) United States Patent
Blaicher

(10) Patent No.: US 11,113,243 B2
(45) Date of Patent: Sep. 7, 2021

(54) METHODS AND APPARATUS FOR SELECTIVE CAPTURE OF MAINFRAME OPERATING SYSTEM RECORDS

(71) Applicant: Syncsort Incorporated, Pearl River, NY (US)

(72) Inventor: Christopher Youngs Blaicher, Keene Valley, NY (US)

(73) Assignee: SYNCSORT INCORPORATED, Pearl River, NY (US)

( * ) Notice: Subject to any disclaimer, the term of this patent is extended or adjusted under 35 U.S.C. 154(b) by 1024 days.

(21) Appl. No.: 15/628,290

(22) Filed: Jun. 20, 2017

(65) Prior Publication Data

US 2018/0365259 A1    Dec. 20, 2018

(51) Int. Cl.
| | |
|---|---|
| *G06F 16/00* | (2019.01) |
| *G06F 16/17* | (2019.01) |
| *G06F 16/13* | (2019.01) |
| *G06F 16/25* | (2019.01) |

(52) U.S. Cl.
CPC ............ *G06F 16/173* (2019.01); *G06F 16/13* (2019.01); *G06F 16/254* (2019.01)

(58) Field of Classification Search
CPC ............ G06F 11/3006; G06F 11/3068; G06F 11/3476; G06F 16/13; G06F 16/173; G06F 16/254
See application file for complete search history.

(56) References Cited

U.S. PATENT DOCUMENTS

| | | | | |
|---|---|---|---|---|
| 5,708,828 | A | * | 1/1998 | Coleman ................. H04L 29/06 715/205 |
| 2012/0254337 | A1 | * | 10/2012 | Fake ....................... H04L 41/06 709/207 |
| 2015/0347260 | A1 | * | 12/2015 | Eckert ................. G06F 11/3476 718/100 |
| 2017/0048317 | A1 | * | 2/2017 | Bishop ...................... G06F 9/46 |

* cited by examiner

*Primary Examiner* — Dinku W Gebresenbet
(74) *Attorney, Agent, or Firm* — Jenkins, Wilson, Taylor & Hunt, P.A.

(57) ABSTRACT

A computer-based method includes receiving, at a compute device, a collected set of system measurement facility (SMF) data from a mainframe operating system. The method includes, retrieving from a memory operatively coupled to the compute device, a set of SMF field-type identifiers. Each SMF field-type identifier having a one-to-one logical relation with a conditional value from a set of conditional values. The method includes selecting SMF field values from the collected set of SMF data, based on the set of conditional values. The SMF field values is a subset of SMF field values included in the collected set of SMF data. The method further includes executing a flattening process to produce a flattened record that includes at least one flattened SMF field value converted into a target format, and inserting the flattened record into a data repository compatible with the target format.

19 Claims, 10 Drawing Sheets

METHODS AND APPARATUS FOR SELECTIVE CAPTURE OF MAINFRAME OPERATING SYSTEM RECORDS

FIELD

At least one embodiment described herein relates generally to the capture and storage of system measurement facility records.

BACKGROUND

Mainframes enable mission-critical applications throughout enterprises by collecting, generating, and processing large data volumes with high performance and reliability. Mainframes excel in processing transactions using bulk processing capacity at high speeds, having an ability to provide services to large and dispersed networks connected to multiple and diverse compute devices.

Many enterprises using mainframes build separate data lakes for big-data analysis isolated from mainframe operational data. These enterprises often miss significant pieces of intelligence when mainframe data is not included in such data lakes. Conversely, an indiscriminate collection of mainframe data is typically not cost-effective because the massive amounts of records generated by mainframes demands high processing power and high storage capacity. This situation results in an underutilization of mainframe data and a diminishment of enterprises' investments in big-data analytic platforms.

Therefore, a need exists for systems to selectively capture mainframe operating system records and transfer these records to data sources for their integration with other business data at the same or nearly the same rate as mainframe records are produced.

SUMMARY

At least one embodiment described herein addresses the need to selectively capture mainframe records at the same or nearly the same rate as they are produced by mainframes and to transfer these records to data sources for their integration with other business data. In some embodiments, a computer-based method includes receiving, at a compute device, a collected set of system measurement facility (SMF) data. The collected set of SMF data is associated with a mainframe operating system. The method includes retrieving from a memory operatively coupled to the compute device, a set of SMF field-type identifiers. Each SMF field-type identifier from the set of SMF field-type identifiers having a one-to-one logical relation with a conditional value from a set of conditional values. The method includes selecting a set of SMF field values from the collected set of SMF data, based on the set of conditional values. The set of SMF field values is a subset of SMF field values included in the collected set of SMF data. The method further includes executing a flattening process over the set of SMF field values to produce a flattened record that includes at least one flattened SMF field value converted into a target format, and inserting the flattened record into a data repository compatible with the target format.

DETAILED DESCRIPTION

Figure 1:
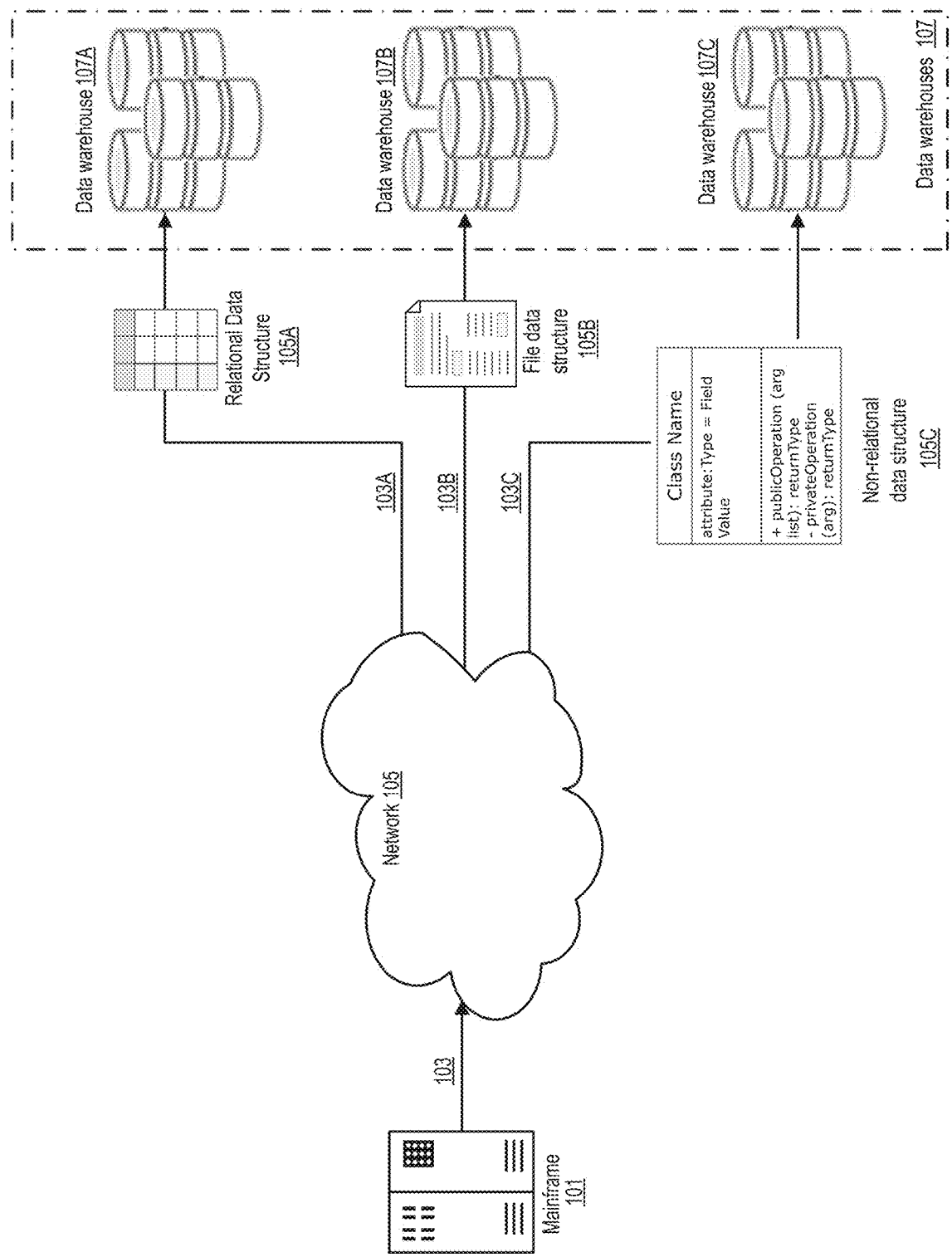
FIG. 1 is a schematic diagram of an implementation of a system for selectively capture system measurement facility records, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "compute device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently-disclosed subject matter. Reference in the specification to "for example," "such as", "for instance" or variants thereof means that a particular feature, structure or characteristic described in connection with the embodiment(s) is included in at least one embodiment of the presently-disclosed subject matter. Thus the appearance of the phrase "for example," "such as", "for instance" or variants thereof does not necessarily refer to the same embodiment(s).

It is appreciated that, unless specifically stated otherwise, certain features of the presently-disclosed subject matter, which are, for clarity, described in the context of separate embodiments, may also be provided in combination in a single embodiment. Conversely, various features of the presently-disclosed subject matter, which are, for brevity, described in the context of a single embodiment, can also be provided separately or in any suitable sub-combination.

Mainframes serve a high number of users, processing thousands of transactions every second while maintaining centralized terabyte-size databases with datasets configured in specialized formats. An indiscriminate aggregation of mainframe datasets to big-data warehouses already storing complex and heterogeneous data can exacerbate common challenges faced by big-data analytics tools. Some of these challenges include data processing speed, scalability, memory resources and use of other suitable computational resources.

When crucial data produced by mainframes is not available to big-data analytics tools, enterprises can miss opportunities to infer or determine critical insights and support, to make informed business decisions. A risk averse solution could be implemented by indiscriminately transmitting all the data produced by mainframes for their storage into big-data platforms or other suitable platforms with analytic capacity. Nevertheless, such a solution imposes significant challenges including an overload of memory and computation capacity of big-data platforms caused by retention and processing of unnecessary or redundant mainframe data. At least one embodiment described herein selectively captures mainframe data at the same rate or nearly the same rate as a mainframe produces it, precluding technical problems caused by temporal storage, retention, and computation of unnecessary or redundant mainframe data.

An example of an implementation for selectively capturing mainframe records is discussed with reference to FIG. 1. Mainframe 101 executes processes discussed with reference to FIG. 5 to FIG. 8 to capture and forward mainframe data to warehouses 107 via computer network 105. For instance, a selection of SMF records can be captured by mainframe 101 and forwarded to data warehouses 107. SMF is a mainframe operating system application used for the measurement of mainframe software services. Mainframe services can be provided by long-lived software objects (typically, daemons) with a name, a clear error boundary, start and stop methods, and dependency relationships to other services provided by a mainframe or system. Mainframe services can cause the production of SMF records at regular and unexpected times. SMF records can include, for example, tens to thousands of individual fields. Often, enterprises and organizations want to capture a subset of the fields in their warehouse environment. Generally, SMF records and SMF field values are not compatible with warehouse environment. Thus, they are typically converted into an adequate, compatible, or targeted format. Such a conversion process is called flattening. SMF records can include data associated with various mainframe operating system components and processes. A non-exhaustive list of SMF record-types and -subtypes with a short description is provided in Table 1 below.

TABLE 1

Examples of SMF Records

| TYPES/SUBTYPE | DESCRIPTION |
| --- | --- |
| SMF 70-1 | CPU activity |
| SMF 70-2 | Cryptographic activity |
| SMF 71 | Paging activity |
| SMF 72-3 | Workload activity by service class |
| SMF 72-4 | Resource usage and delay data by service class/period |
| SMF 72-5 | Serialization delay data |
| SMF 73 | Channel activity |
| SMF 74-1 | Device activity |
| SMF 74-2 | Cross-System Coupling Facility (XCF) data |
| SMF 74-3 | Open Edition Multiple Virtual Storage (MVS) |
| SMF 74-4 | Coupling facility data |
| SMF 74-5 | Cache data records |
| SMF 74-6 | Hierarchical File System (HFS) statistics |
| SMF 74-7 | Fiber connection director statistics |
| SMF 74-8 | Enterprise Storage Server (ESS) statistics |
| SMF 74-9 | Peripheral Component Interconnect (PCI) data |
| SMF 75 | Page data set activity |
| SMF 76 | System control block trace data |
| SMF 77 | Enqueue activity |
| SMF 78-2 | Virtual storage data |
| SMF 78-3 | Input Output queuing data |

In some instances, SMF records can be categorized using identifiers indicating a record type and a record subtype as shown in the first column of Table 1. For instance, "SMF 70-1" denotes a Resource Measurement Facility (RMF) record type of the subtype "1" which contains data fields with measurement data for general and special purpose mainframe processors, logical partitions, and mainframe internal coupling facilities. Each field in a SMF record is similarly associated with an identifier for instance, "SMF 70-1" records include field-type "SMF70MOD" (field-types not shown in Table 1) to indicate a CPU processor family, field-type "SMF70VER" to indicate a CPU version, and field-type "SMF70WLA" to indicate processor capacity available to Multiple Virtual Storage (MVS).

Computer network 105 can include one or more types of communication networks. For example, communication networks can include Internet connectivity, a local area network (LAN), a wide area network (WAN), a metropolitan area network (MAN), various types of telephone networks (including, for example, Public Switch Telephone Network (PSTN) with Digital Subscriber Line (DSL) technology) or mobile networks (including for example, Global System Mobile (GSM) communication, General Packet Radio Service (GPRS), Code Division Multiple Access (CDMA), and other suitable mobile network technologies), or any combination thereof. Communication within such a computer network can be enabled through any suitable connection (including wired or wireless) and communication technology or standard e.g., wireless fidelity (WiFi™), 4G™, long-term evolution (LTE™), or other suitable standard.

Mainframe 101 can be configured, for example, to execute time-sharing jobs at predetermined times, batch jobs, online transaction processing jobs, and other suitable computations. Some specific examples of batch jobs include closing accounting books at month-end, copying disk files to tape memories for backup, and other suitable mainframe computations. Mainframe 101 can run different types or versions of mainframe operating systems (OS), for example, z/VM®, z/VSE™, Linux for System Z®, z/OS®, z/TPF®, and other suitable mainframe OS. Such operating systems can produce records indicating baseline OS processes running on mainframes 101 and other OS-related data, including input and output (I/O) data, network activity, software usage, error conditions, processor utilization, data described below with reference to Table 1, and other suitable mainframe processes' data.

Data warehouses 107 can be data repositories that store data of an enterprise, business, company, or other suitable entity. Data warehouses 107 can integrate data from multiple data sources; for example, data warehouses 107 can store data from mainframe 101, and other applications and compute devices associated with an enterprise, or other suitable entity. In some implementations, data warehouses 107 can be used by one or more applications to generate business intelligence to support decision-making processes. For instance, data warehouses 107 can be used by big-data processing platforms such as Hadoop™, IBM® Informix®, MongoDB™, and other suitable big-data platforms. In some other implementations, data warehouses 107 can be used by analytic applications such as Splunk Cloud™, Google Analytics™, Siense™, and other suitable analytics tools.

In some implementations, mainframe 101 can selectively capture SMF records and SMF field values by parsing SMF records and collecting SMF values based on predetermined criteria. In some instances, mainframe 101 captures all SMF values of a record type, all the SMF field values of a record subtype, a subset of SMF field values from a record type, a subset of SMF field values of a record subtype or other suitable SMF field values based on the predetermined criteria. In some instances, mainframe 101 can be configured to not capture one or more SMF records and SMF-field values based on the predetermined criteria.

In some implementations, a user or a non-person entity can configure the predetermined criteria to selectively capture SMF field values at different granularity levels. For example, in some instances, mainframe 101 can include criteria to capture all values of record types "SMF-70" (including SMF record subtypes "SMF-70-1" and "SMF-70-2"). In other instances, mainframe 101 can capture SMF data based on more specific criteria for instance, based on criteria specifying to capture field values "SMF70MOD" of record subtype "SMF 70-1." Likewise, in some implementations, a user or non-person entity can configure the predetermined criteria to selectively not capture one or more SMF field values. A further discussion of the data structures used to implement the predetermined criteria of mainframe 101 is provided below with reference to FIG. 9 and FIG. 10.

Mainframe 101 selectively captures and forward SMF record values at a throughput rate that minimizes the delivery cycle time, i.e., the time taken to deliver a selected set of mainframe data from mainframe 101 to data warehouses 107. The delivery cycle time is minimized in part because mainframe 101 selects and processes mainframe records at the same rate or nearly the same rate as the records are produced by, for example, the mainframe's operative system.

In some implementations, mainframe 101 minimizes the delivery cycle time by parsing SMF records immediately after their production to identify SMF data configured to be captured, transforming the captured SMF data into a data warehouse format (i.e., flattening SMF data), and delivering the transformed data to one or more of data warehouses 107. For instance, if mainframe 101 process two billion transactions per day, mainframe 101 can implement processes to selectively capture and forward SMF data produced from such transactions. Mainframe 101 overcomes the need of having memory repositories (e.g., disk drives 315) dedicated to handle bottlenecks of SMF data that may occur when mainframe 101 operates close to its full capacity or at anomalous rates. Likewise, in some implementations, the use of dedicated memory resources and computation time expended in retrieving and processing backlog of SMF data batches at asynchronous times (i.e., at times different from the production times) are unnecessary and/or precluded in the embodiments described herein. Overall, mainframe 101 minimizes the delivery cycle of mainframe output data to warehouses and other suitable repositories by processing and transmitting only selected subsets of SMF record values specified in a predetermined criteria. This minimizes storage and temporary retention periods between mainframe 101 and data warehouses 107. Thus, data output 103 can be transformed into output data streams 105A, 105B, 105C, or other suitable format enabling data warehouses 107 to receive and integrate mainframe data into their data sets at a similar rate as mainframe 101 produces such data.

In some implementations, mainframe 101 can convert or flatten SMF data into a data format ("targeted format") used by, or compatible with, a format supported by a destination data warehouse. For example, in some instances, mainframe 101 can flatten or convert SMF records into a relational database format by generating relational data structure 105A instantiated with SMF data values and metadata (e.g., descriptive, structural, and/or administrative metadata). In some instances, mainframe 101 includes processor-executable instructions in relational data structure 105A, for example an "INSERT" command in Structured Query Language. Accordingly, data warehouse 107A can integrate relational data structure 105A into tables and fields as specified in the relational data structure. In some other instances, mainframe 101 can convert SMF data into a file format by generating file data structure 105B instantiated with SMF data values and metadata e.g., metadata indicating a folder or other location in data warehouse 107B where file data structure should be stored. In yet some other instances, mainframe 101 can convert SMF records into a non-relational database format, by generating non-relational data structure 105C instantiated with SMF data values and metadata to produce a data structure in, for example, JavaScript Object Notation (JSON), Comma-Separated Values (CSV) format, Tab Separated Values (TSV) format, or other suitable non-relational database format. Relational data structure 105A, file data structure 105B, and non-relational data structure 105C are non-limiting examples of targeted formats. Mainframe 101 can equally flatten SMF data into other suitable target formats.

Figure 2:
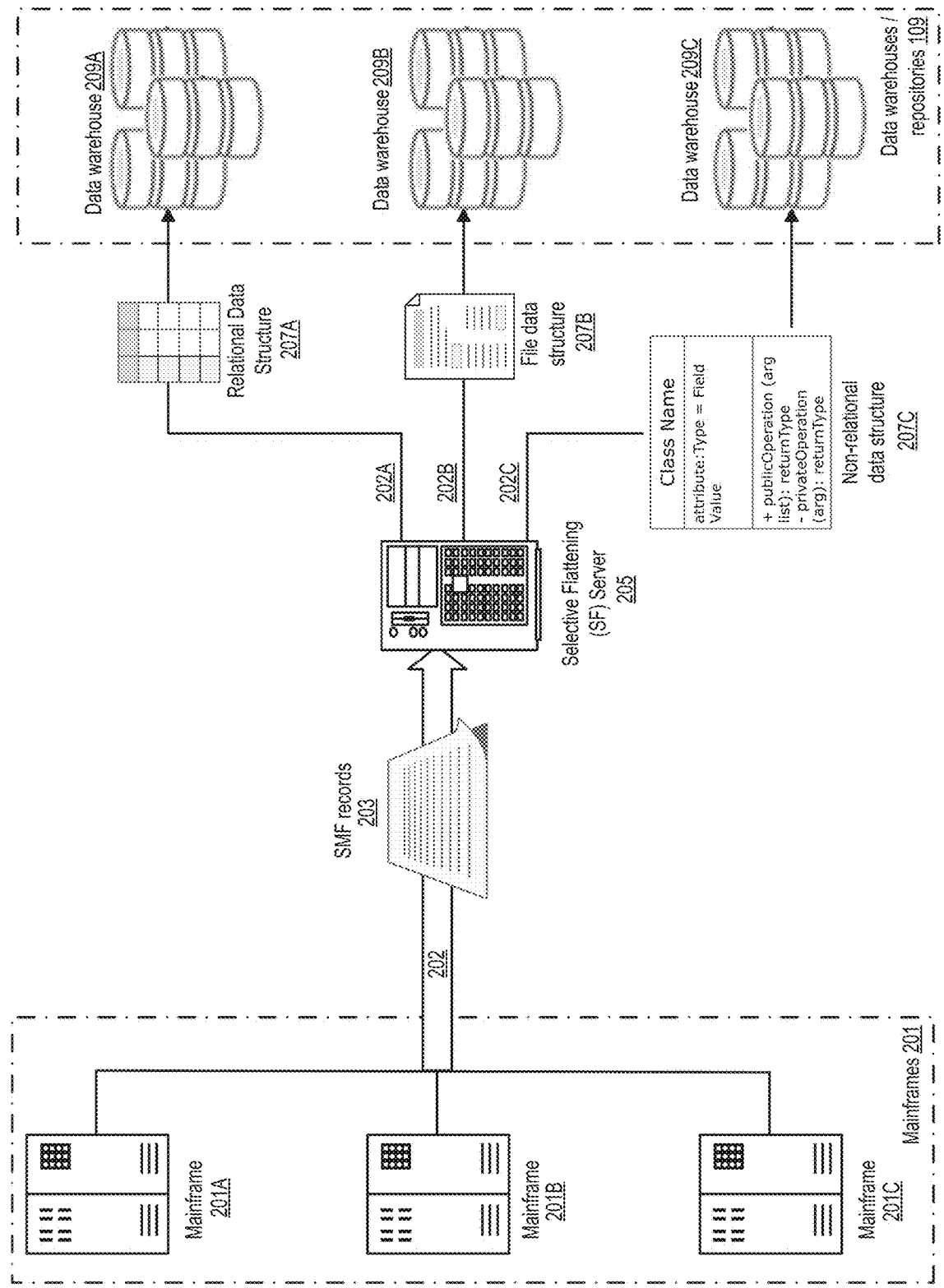
FIG. 2 is a schematic diagram of an implementation of a system for selectively capture system measurement facility records, according to another embodiment.

An example of another implementation for selectively capturing mainframe records is discussed with reference to FIG. 2. As shown in FIG. 2, selective flattening (SF) server 205 can be communicatively coupled to one or more mainframes 201. For example, in FIG. 2, SF server 205 is a compute device communicatively coupled to mainframe 201A, mainframe 201B, and mainframe 201C. In addition, SF server 205 can be communicatively coupled to one or more data warehouses 209 or other suitable repositories. For example, SF server 205 is communicatively coupled to data warehouse 209A, data warehouse 209B, and data warehouse 209C.

In some implementations, SF server 205 can be directly coupled to mainframes 201 and/or data warehouses 209. While in other implementations, SF server 205 can be coupled to mainframes 201 and data warehouses 209 via a computer network (not shown in FIG. 2). SF server 205 can receive or capture data output stream 202 having System Management Facility (SMF) records 203. In this instance, SF server 205 receives SMF records 203 from mainframe 201A, mainframe 201B, and mainframe 201C. In other implementations however, SF server 205 can receive or capture SMF records or other suitable mainframe data from a single mainframe or a different number mainframes than the ones shown in mainframes 201.

In some implementations, SF server 205 can selectively capture SMF records and SMF field values from data output stream 202 by parsing SMF records 203 and collecting SMF values based on predetermined criteria. In some instances, SF server 205 captures all SMF values of a record type, all the SMF field values of a record subtype, a subset of SMF field values from a record type, a subset of SMF field values of a record subtype or other suitable SMF field values based on the predetermined criteria. In some instances, SF server 205 is configured to not capture one or more SMF records and SMF-field values from data output stream 202 based on the predetermined criteria.

As discussed above with reference to FIG. 1, in some implementations, a user or a non-person entity can configure the predetermined criteria to selectively capture SMF field values at different granularity levels. For example, in some instances, SF server 205 can include criteria to capture all values of record types "SMF-70" (including SMF record subtypes "SMF-70-1" and "SMF-70-2"). In other instances, SF server 205 can capture SMF data based on more specific criteria for instance, based on criteria specifying to capture field values "SMF70MOD" of record subtype "SMF 70-1." Likewise, in some implementations, a user or non-person entity can configure the predetermined criteria to selectively not capture one or more SMF field values. A further discussion of the data structures used to implement the predetermined criteria of SF server 205 is provided below with reference to FIG. 9 and FIG. 10.

SF server 205 selectively captures and processes SMF record values from data output stream 202 at a throughput rate that minimizes the delivery cycle time, i.e., the time taken to deliver a selected set of mainframe data from mainframes 201 to data warehouses 209. The delivery cycle time is minimized in part because SF server 205 selects and processes mainframe records at the same rate or nearly the same rate as the records are dumped into (or provided via) data output stream 202.

In some implementations, SF server 205 minimizes the delivery cycle time by parsing SMF records 203 immediately after reception to identify SMF data configured to be captured, transforming the captured SMF data into a data warehouse format, and delivering the transformed data to one or more of data warehouses 209. For instance, if mainframes 209 process seven billion transactions per day, SF server 205 can be implemented to selectively capture and process SMF data produced from such transactions. SF server 205 overcomes the need of having memory repositories dedicated to handle bottlenecks of SMF data that may occur when mainframes 201 operate close to their full capacity or at anomalous rates. Likewise, in some implementations, the use of dedicated memory resources and computation time expended in retrieving and processing backlog of SMF data batches at asynchronous times (i.e., at times different from the reception times) are unnecessary and/or precluded in the embodiments described herein. Overall, SF server 205 minimizes the delivery cycle of mainframe output data to warehouses and repositories by processing and transmitting only selected subsets of SMF record values specified in a predetermined criteria. This minimizes storage and temporary retention periods between mainframes 201 and data warehouses or repositories 209. Thus, data output stream 202 seamlessly branches off output data streams 202A, 202B, and 202C, enabling data warehouses 209 to receive and integrate mainframe data into their data sets at a similar rate as mainframes 201 produce such data.

Similar to the embodiment discussed with reference to FIG. 1, in some implementations, SF server 205 can convert or flatten captured SMF data into a data format ("targeted format") used by, or compatible with, a format supported by a destination data warehouse. For example, in some instances, SF server 205 can convert captured SMF records into a relational database format by generating relational data structure 207A instantiated with SMF data values and metadata (e.g., descriptive, structural, and/or administrative metadata). In some instances, SF server 205 includes processor-executable instructions in relational data structure 207A, for example an "INSERT" command in Structured Query Language. Accordingly, data warehouse 209A can integrate relational data structure 207A into tables and fields as specified in the relational data structure. In some other instances, SF server 205 can convert captured SMF data into a file format by generating file data structure 207B instantiated with SMF data values and metadata e.g., metadata indicating a folder or other location in data warehouse 209B where file data structure should be stored. In yet some other instances, SF server 205 can convert captured SMF records into a non-relational database format, by generating non-relational data structure 207C instantiated with SMF data values and metadata to produce a data structure in, for example, JavaScript Object Notation (JSON), Comma-Separated Values (CSV) format, Tab Separated Values (TSV) format, or other suitable non-relational database format. Relational data structure 207A, file data structure 207B, and non-relational data structure 207C are non-limiting examples of targeted formats. SF server 205 can equally flatten SMF data into other suitable target formats.

Figure 3:
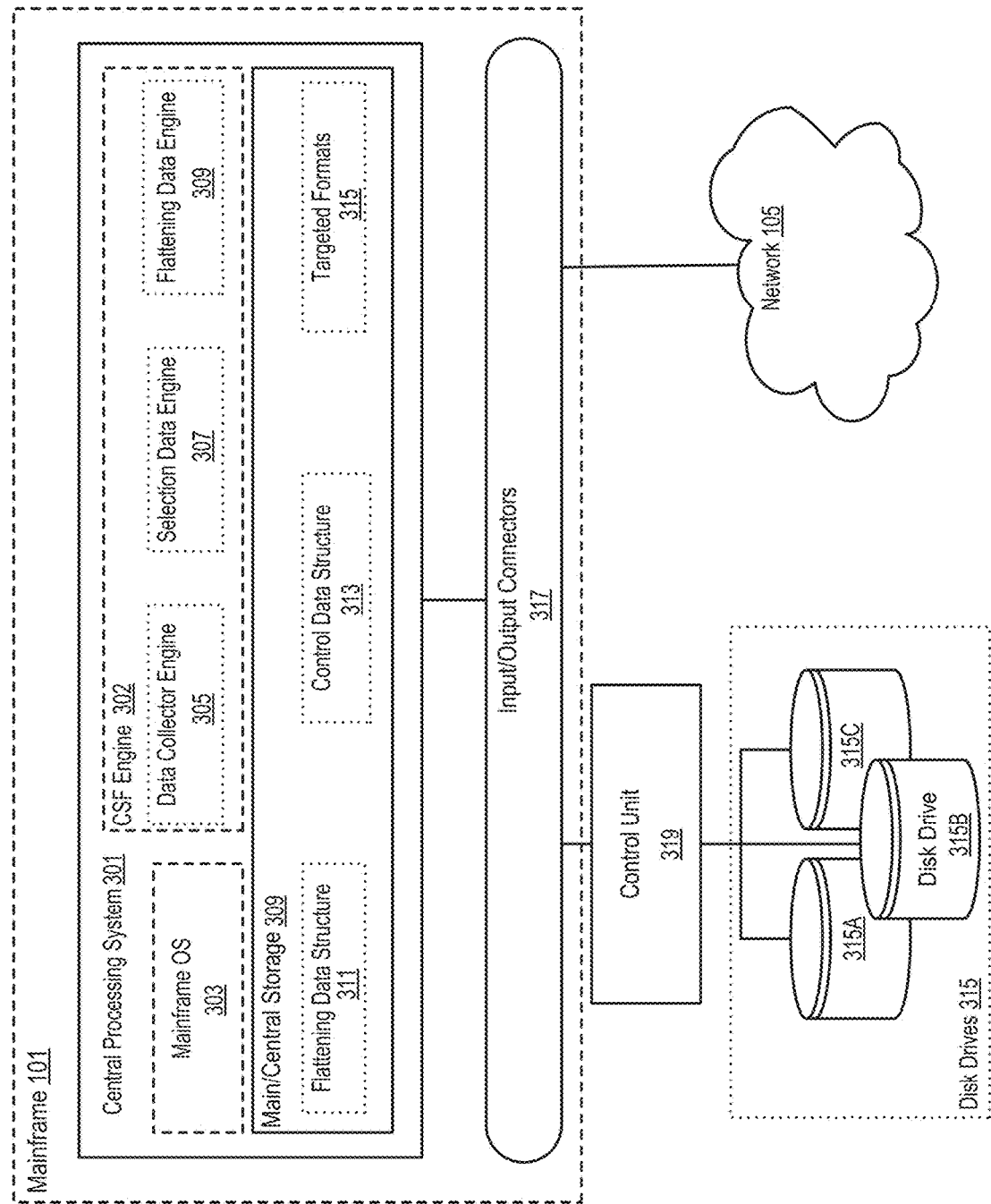
FIG. 3 is a block diagram illustrating a first example of a compute device configuration for an implementation of a system for selectively capture system measurement facility records, according to an embodiment.

Internal components of mainframe 101 are illustrated in FIG. 3. In some implementations, central processing system 301 includes multiple processing units or central processors (not shown in FIG. 3) that are specialized processors for the execution of a variety of high-volume, processing-intensive tasks. In this implementation, central processing system 301 includes mainframe operative system (OS) 303. Mainframe OS 303 dispatches processing tasks to parallel processing units contained in central processing system 301, executes resource management tasks, and produces mainframe records.

Data collector engine 305 receives a mainframe data output stream, for instance, a mainframe output stream including mainframe records. In some instances, data collector engine 305 can be configured to receive a mainframe data output stream including SMF records produced by a single mainframe e.g., mainframe 101. In some other instances, data collector engine 305 can be configured to receive a mainframe data output stream including SMF records from multiple mainframes, as illustrated in FIG. 2. In some implementations, data collector engine 305 can be communicatively coupled to a SMF of a mainframe operating system (OS) 303. Alternatively, in some other implementations, data collector engine 305 can be configured to receive and/or capture mainframe records directly from a mainframe's OS and/or via a SYSOUT intermediate interface.

In some implementations, selection data engine 307 retrieves from central storage 309 and/or other memory coupled to central processing system 301 (e.g., disk drives 315), a set identifiers indicating SMF record types, SMF record subtypes (e.g., SMF record types and subtypes shown in Table 1), and/or SMF field-type identifiers. In some implementations, the set of identifiers retrieved by selection data engine 307 are specified in control data structure 313 stored in central storage 309. In some instances, field-type identifiers configured to be captured from a mainframe output data stream are marked or flagged with a conditional value (in a one-to-one relationship) in control data structure 313. Control data structure 313 is further discussed below with reference to FIG. 10.

In some instances, selection data engine 307 parses SMF data received or captured by data collector engine 305 to determine a set of SMF record-type identifiers and SMF field-type identifiers logically related to SMF record-type identifiers in the set of SMF record-type identifiers. Thereafter, selection data engine 307 retrieves a set of SMF field-type identifiers from control data structure 313, each SMF field-type identifier from the set of SMF field-type identifier linked to a conditional value specifying whether or not a SMF field value is set to be flattened. Selection data engine 307 uses the retrieved set of SMF field-type identifiers to extract a set of SMF field values from the SMF data received or captured by data collector engine 305. Subsequently, selection data engine 307 includes or appends the extracted set of SMF field values into a SMF target subset and sends the SMF target subset to flattening data engine 309.

In some implementations, flattening data engine 309 converts a subset of SMF record values (i.e., field values) into a targeted format from a set of targeted formats defined at 315. In some implementations, flattening data engine 309 executes flattening code retrieved from or via flattening data structure 311. Flattening data structure 311 is further discussed below with reference to FIG. 9.

Main/Central storage 309 is a high-speed physical memory. In some implementations, main storage 309 includes an array with hot swappable Random Access Memory (RAM) cards. In some other implementations, high speed or RAM memory can be embedded in one or more processing units included in central processing system 301 to increase data transfer speed.

Input/Output connectors 317 couple central processing system 301 and main/central storage 309 with other compute devices for instance, control unit 319. Input/Output connectors 317 ensure data transmission according to one or more communication protocols and perform other suitable data transfer operations. In some implementations, input/output connectors 317 can include coaxial cables, fiber optic cables, or other suitable transmission channel. In some instances, big data platform systems, distributed file systems or other suitable systems (not shown in FIG. 3) can be coupled to mainframe 101 via input/output connectors 317 and/or via computer network 105.

In some implementations, control unit 319 can include combination of hardware and software to provide logical capabilities to operate and control an I/O device. Control unit 319 can adapt I/O devices to the standard form of control provided by a channel or connector. In some implementations, control unit 319 can be housed in a separate hardware as shown in FIG. 3. In other implementations, control unit 319 can be physically and logically integrated in an I/O device. Examples of I/O devices include disk drives, tape drives, communication interfaces, printers, and other suitable devices. In some implementations, disk drives 315 can be direct-access storage devices (DASD) that provide long-term storage and quick retrieval of large amounts of data. In some implementations, disk drives 315 can include magnetically coated disks spinning at high speeds for reading and writing data. In some implementations, disk drives 315 can include one or more of flattening data structure 311, control data structure 313, and target formats 315.

Figure 4:
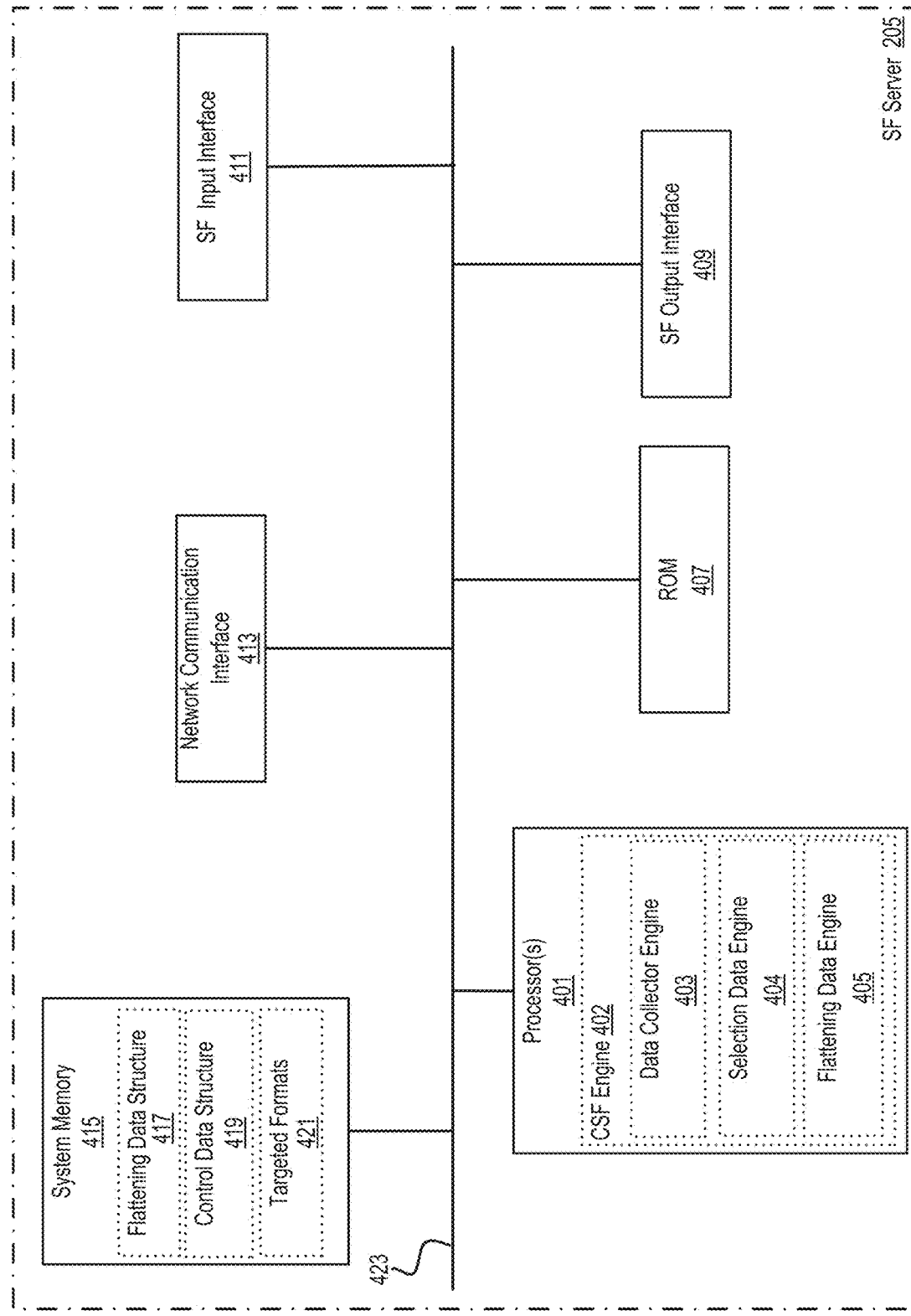
FIG. 4 is a block diagram illustrating a second example of a compute device configuration for an implementation of a system for selectively capture system measurement facility records, according to an embodiment.

Internal structures of an implementation of SF server 205 are discussed with reference to the compute device shown in FIG. 4. Bus 423 represents system, peripheral, and/or chipset buses that communicatively couple numerous internal devices of SF server 205. For instance, bus 423 communicatively couples processor 401 with read-only memory 407, system memory 415, network communication interface 413, SF input interface 411, and SF output interface 409. Processor 401 can retrieve instructions and data structures to execute the processes of embodiments described herein from memories 415 and/or 407.

Processor 401 can be a single processor, a multi-core processor, or an arrangement of processors in different implementations. In some instances, processor 401 can be any suitable processor such as, for example, a general-purpose processor, a field programmable gate array (FPGA), an application specific integrated circuit (ASIC), a virtual processor, and/or other suitable hardware device.

Read-only memory (ROM) 407 stores static data and instructions used by processor 401 and/or other components of SF server 405. System memory 415 can be a read-and-write memory device. System memory 415 stores some of the processor-executable instructions and data that processor 401 uses at runtime for instance, processor-executable instructions to initiate and maintain a selective capture of SMF data and flatten SMF data into a targeted format. In some implementations, processor-executable instructions can reside in other memories, e.g., memory embedded in processor 401 or other memory coupled to processor 401 and/or SF server 205.

In some implementations, system memory 415 or other suitable memory embedded or coupled to processor 401 includes processor-executable instructions to instantiate flattening data structure 417 initialized with a set of SMF record-type identifiers. Each SMF record-type identifier from the set of SMF record-type identifiers is linked to at least one SMF field-type identifier. Each of the at least one SMF field-type identifier can be, for example, logically related to flattening code snippet. The processor-executable instructions also includes instructions to instantiate control data structure 419 initialized with a set of predetermined criteria specifying whether a system measurement facility (SMF) field value is designated to be flattened. The processor-executable instructions further include instructions to instantiate targeted formats 421. Targeted formats 421 include a set of data formats e.g., comma separated value, tab separated value, serialized data format, JSON, relational, non-relational data formats and other suitable formats used by data warehouses 209 (in FIG. 2) or other suitable repositories receiving flattening data from SF server 205.

In some implementations, system memory 415 can include processor-executable instructions to instantiate at processor 401, CFS engine 402 including data collector engine 403, selection data engine 404, and flattening data engine 405. Data collector engine 403, selection data engine 404 and flattening data engine 405 are respectively, structurally and functionally analogous to data collector engine 305, selection data engine 307, and flattening data engine 309 discussed above with reference to FIG. 3.

SF input interface 411 enables users or non-person entities to enter configuration files to, for example, update data included in flattening data structure 417, control data structure 419, targeted formats 421 or other suitable data structures and processor-executable instructions residing in SF server 205. Input devices used with SF input interface 411 include, for example, alphanumeric keyboards, pointing devices, touch screen interfaces and other suitable input devices.

SF output interface 409 enables the display of data stored in, for example, control data structure 419, flattening data structure 417, targeted formats 421 or other suitable data stored in system memory 415. Flattening data structure 417, control data structure 419 and targeted formats 421 are respectively, structurally and functionally analogous to flattening data structure 311 control data structure 313, and targeted formats 315 discussed with reference to FIG. 3. In some implementations, SF server 205 can send information via output interface 409, to display a graphical user interface for users to update flattening data structure 417, control data structure 419, and/or targeted formats 421. Such a graphical user interface can be displayed in a screen, monitor, or other suitable output device coupled to SF output interface 409. In some instances updates to data structures (417, 419, 421, or other suitable data structures) in SF server 205 can be performed by submitting configuration files, in response to user inputs or other types of human-computer interactions. Likewise, mainframe operational status, processed mainframe records or other suitable mainframe data can be displayed via a suitable output device coupled to SF output interface 209.

Figure 5:
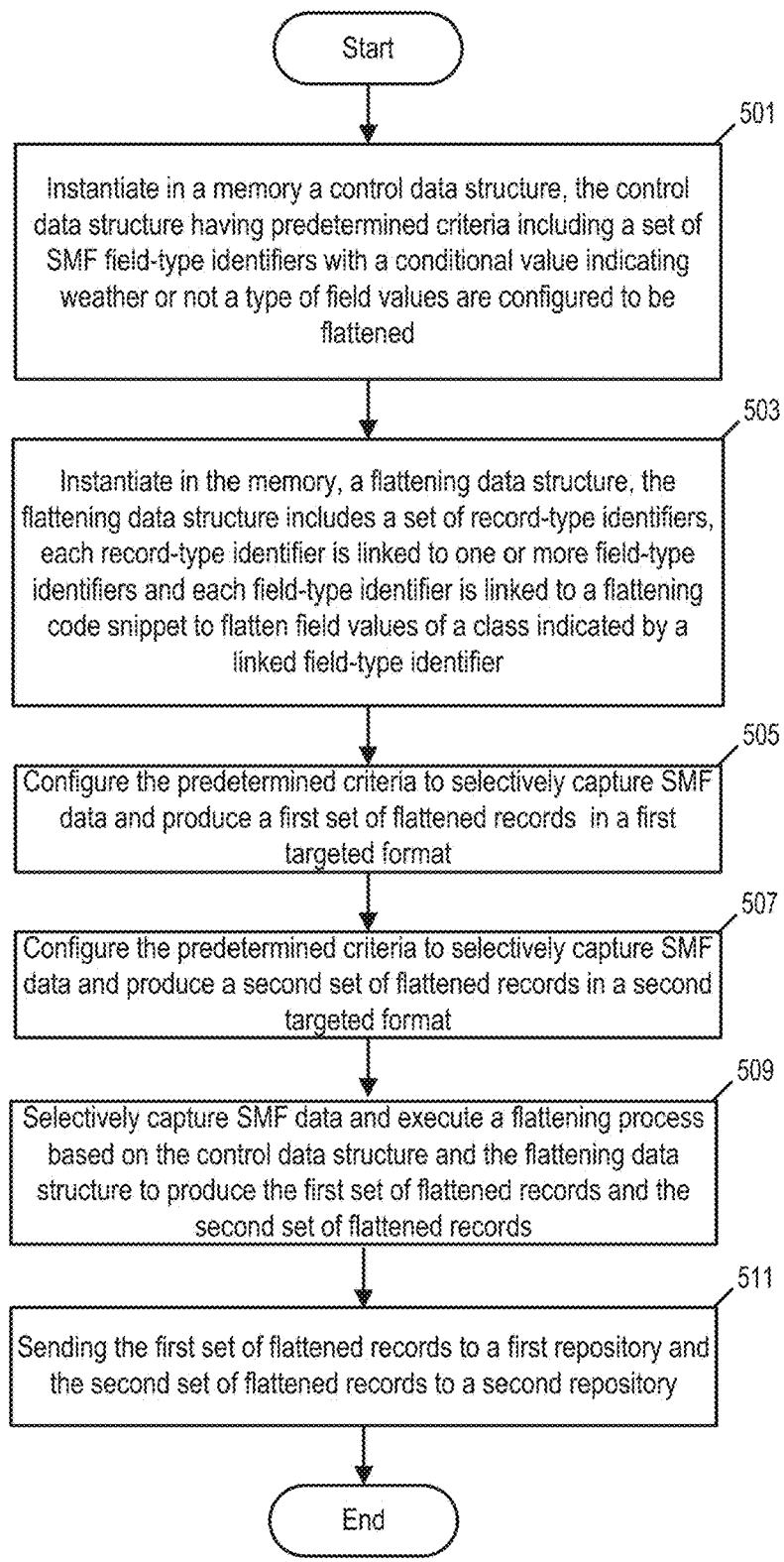
FIG. 5 is a flowchart illustrating an execution of an instantiation process of a control data structure, a flattening data structure, and a flattening process to produce sets of flattened records, according to an embodiment.
Figure 6:
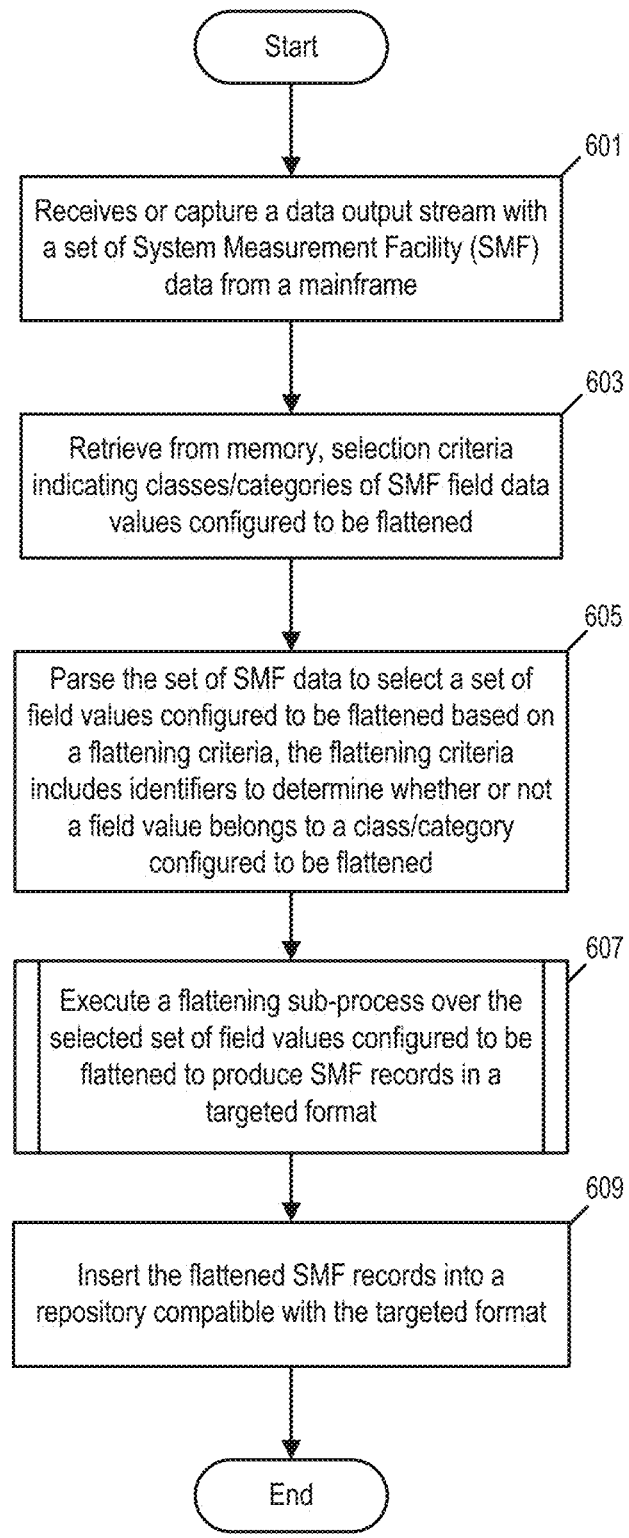
FIG. 6 is a flowchart illustrating an execution of a selective capture of mainframe operating system records process to produce a flattened record based on flattening criteria, according to an embodiment.
Figure 7:
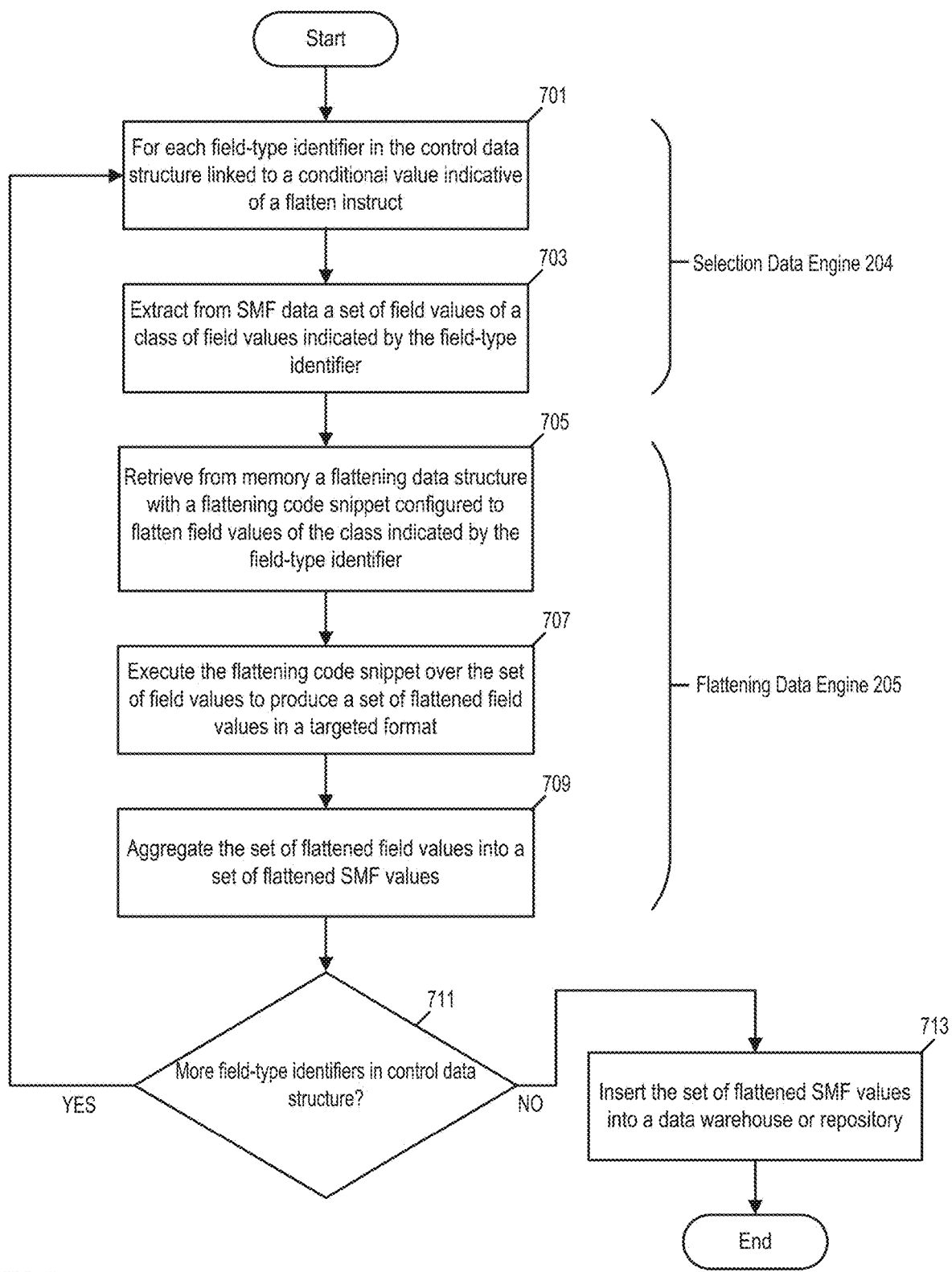
FIG. 7 is a flowchart illustrating an iterative process for the selective capture of mainframe operating system records and flatten system measurement facility records based on a control data structure, according to an embodiment.

The processes illustrated in FIG. 5, FIG. 6, and FIG. 7 can be, in some implementations, executed by mainframe 101, SF server 205, and other suitable compute devices. Likewise, the signal flow discussed with reference to FIG. 8 can be analogously executed by mainframe 101 and SF server 205. Moreover, the data structures discussed with reference to FIG. 9 and FIG. 10 can be implemented in mainframe 101, SF server 205 and other suitable compute devices.

An example configuration process for mainframe 101 to selectively capture records from more than one mainframe is shown in FIG. 5. At 501, mainframe 101 or alternatively SF server 205 instantiates in a memory (e.g., central storage 309 shown in FIG. 2 or system memory 215 shown in FIG. 4) a control data structure. Such a control data structure can include predetermined criteria specifying a set of SMF field-type identifiers. Each SMF field-type identifier is paired (in a one-to-one relationship) with a conditional value. The conditional value indicates if a type or class of fields should be captured and subsequently flattened.

At 503, mainframe 101 (or alternatively SF server 205) instantiates in the memory a flattening data structure. The flattening data structure includes a set of record-type identifiers. Each record-type identifier is linked to one or more field-type identifiers. Each field-type identifier is linked to a flattening code snippet with processor-executable instructions to flatten field values of a type or class indicated by the field-type identifier. In some implementations, mainframe 101 can configure predetermined criteria in a control data structure to selectively capture SMF data, and produce flattened records in a targeted format. For instance, a targeted format can be a format that is compatible with or native to a destination source such as data warehouses 107 discussed above with reference to FIG. 1.

In some instances, mainframe 101 can include predetermined criteria to selectively capture different SMF data for different data sources. For instance, at 505, mainframe 101 configures the predetermined criteria in the control data structure to capture SMF data and produce a first set of flattened records in a first targeted format. Similarly, at 507, mainframe 101 configures the predetermined criteria in the control data structure to further capture SMF data and produce a second set of flattened records in a second targeted format. It is appreciated that, in some instances, mainframe 101 can configure the predetermined criteria to capture corresponding SMF data at 505 and 507. While in some other instances, mainframe 101 can configure the predetermined criteria to capture different SMF data at 505 and 507. Likewise, it is appreciated that in some instances, mainframe 101 can configure, at 505, predetermined criteria to produce the first set of flattened records and configure, at 507, criteria to produce the second set of flattened records in a corresponding targeted format. While in some other instances, mainframe 101 can configure predetermined criteria to produce the first set of flattened records and the second set of flattened records in different targeted formats.

In some implementations, mainframe 101, collects via data collector engine 305 and selectively captures SMF data (e.g., via selection data engine 307 in FIG. 3) and executes, at 509, a flattening process (e.g., via flattening data engine 309 in FIG. 3) based on the control data structure and the flattening data structure to produce the first set of flattened records and the second set of flattened records. At 511, mainframe 101 sends the first set of flattened records to a first repository (e.g., data warehouse 109A in FIG. 1) and the second set of flattened records to a second repository (e.g., data warehouse 109B in FIG. 1).

The process illustrated in FIG. 5 was discussed generally as a process executed by mainframe 101 however, in some alternative embodiments the process at FIG. 5 can be analogously performed by SF server 205 shown in FIG. 2. In such a case, SF server 205 receives or captures a set of SMF data via, for instance, data collector engine 403 discussed with reference to FIG. 4. The set of SMF data can be received or captured from one or more mainframes via, for example, data output stream 202 discussed above with reference to FIG. 2. Other embodiments to selectively capture mainframe operating system records that can be performed by, for example, mainframe 101 or SF server 205 are discussed below with reference to FIG. 6 and FIG. 7.

In FIG. 6, SF mainframe 101 receives or captures at 601 a data output stream with a set of SMF data from a mainframe (e.g., via data collector engine 305 in FIG. 3). Thereafter, at 603, mainframe 101 retrieves from memory a selection or predetermined criteria indicating classes, types of SMF field data values configured to be flattened. At 605, mainframe 101 parses the set of SMF data to select a set of field values configured to be flattened based on a flattening criteria. Such a flattening criteria includes identifiers to determine whether or not a field value belongs to a class, category, or field-type configured to be flattened. A further discussion of the flattening criteria is discussed below with reference to control data structure shown in FIG. 10.

Mainframe 101 executes a flattening sub-process at 607 over the selected set of field values configured to be flattened producing SMF records in a targeted format. A further discussion of the flattening sub-process is provided with reference to FIG. 7. Thereafter, mainframe 101 inserts, at 609, flattened SMF records into a repository compatible with the targeted repository. Alternatively or additionally, mainframe 101 can send the flattened SMF records to a repository such that the SMF records are integrated to a data set residing in the repository.

Turning to FIG. 7, in some implementations, selection data engine 304 (FIG. 3) or alternatively selection data engine 404 (FIG. 4) receives or captures SMF data or other suitable mainframe data from, for example, data collector engine 305 (shown in FIG. 3). In some implementations, mainframe 101 retrieves a control data structure from memory via, for example, selection data engine 307. At 701, selection data engine 307 starts an iteration loop in which each field-type identifier in the control data structure, linked to a conditional value indicative of a flatten instruct, is selected. Selection data engine 307 extracts, at 703, from the SMF data (or other suitable mainframe data) a set of field values of a class or type of field values indicated by the field-type identifier. Stated differently, selection data engine 307 selects from the SMF data field values that match or belong to the class or type indicated by the field-type.

As discussed above, in some implementations, at 705, a flattening data structure is retrieved (e.g., by flattening data engine 309) from memory, (e.g., central storage 309 in FIG. 3). The flattening data structure includes code snippets with processor-executable instructions to flatten field values of the class or type indicated by the field-type identifier. Thereafter, at 707, the flattening code snippet is executed (e.g., by flattening data engine 309) over the set of field values selected (e.g., by selection data engine 307), to produce a set of flattened field values in a targeted format. In some instances, the flattening code snippet determines field identifier equivalencies between field-type identifiers and a set of field identifiers formatted or describing a format of a target format. Such equivalent values can be stored and retrieved in targeted formats 315 shown in FIG. 3. Accordingly, a flattening version of the set of field values is produced (e.g., by mainframe 101) generating a data structure using equivalency values and/or relations between field values and versions of such field values in the targeted format. Then, at 709, the flattened field values are aggregated or store (e.g., by flattening data engine 309) into an array, a data object, or other suitable data structure implemented to store a set of flattened SMF values.

In some implementations, conditional statement 711 controls the iterations of the loop initiated at 701. The loop shown in FIG. 7 iterates according to a number of field-type identifiers, e.g., stored in control data structure, linked to a conditional value indicative of a flatten instruction. The loop initiated at 701 is controlled by conditional statement 713 which upon a determination that there are no more field-type identifiers linked to a flatten instruction breaks or terminates the loop. In some implementations, at 713, the set of flattened SMF values are inserted (e.g., by mainframe 101) into a data warehouse or repository. Alternatively or additionally, mainframe 101 can send or deploy the set of flattened SMF values to a destination data warehouse or repository such that, the set is integrated into a destination data set.

Figure 8:
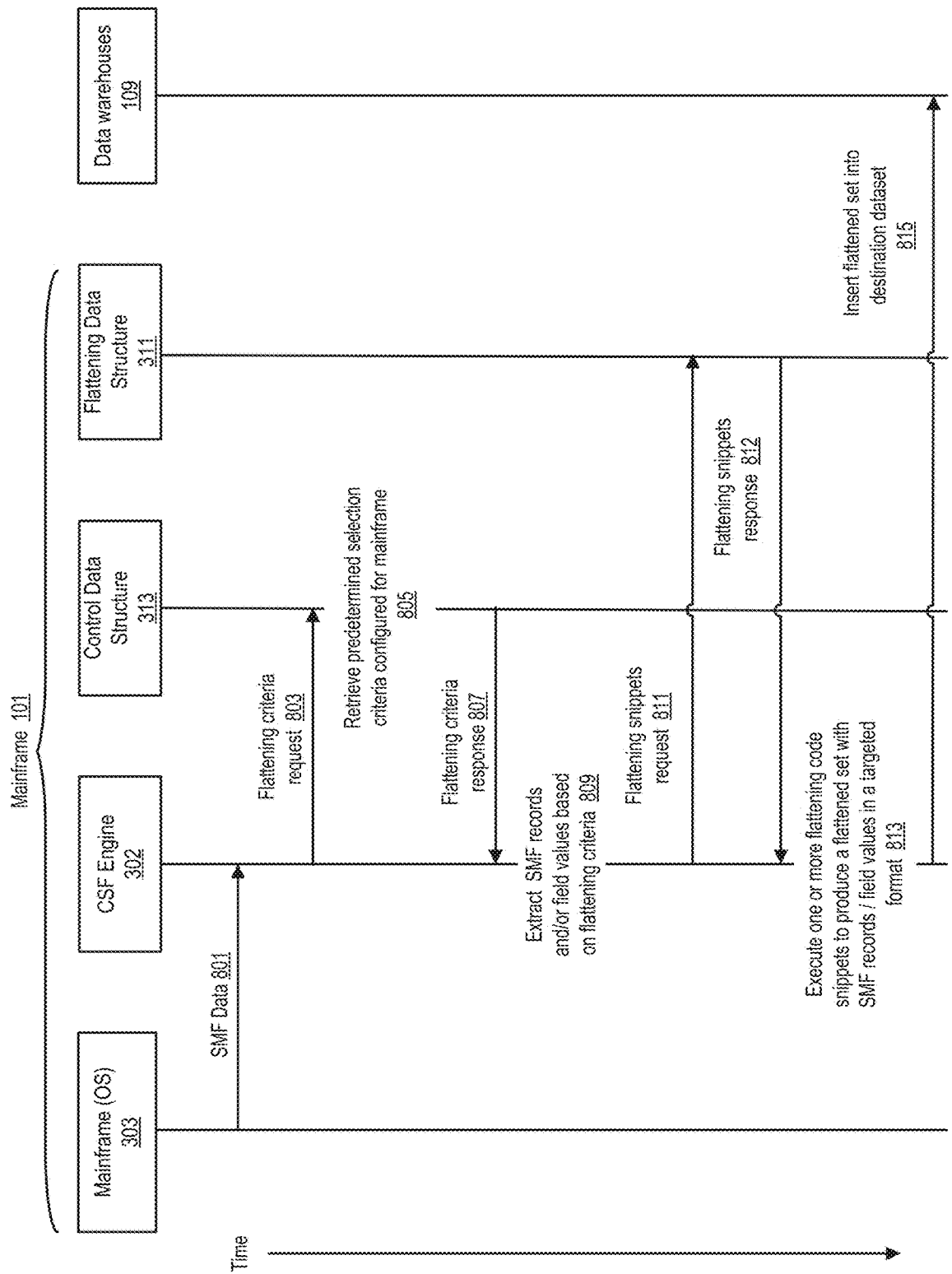
FIG. 8 is a signal flow diagram illustrating an exchange of digital signals between components of a system for selectively capture system measurement facility records, according to an embodiment.

An example of a signal flow between mainframe's operative system 303, CSF engine 302, control data structure 313, flattening data structure 311, and data warehouses 109 is discussed with reference to the signal flow diagram of FIG. 8. As shown in FIG. 8, mainframe 101 sends SMF data 801 to CSF engine 302 implemented at mainframe 101. Thereafter, CSF engine 302 sends request for flattening criteria (e.g., via signal 803) to control data structure 313. A process is executed at control data structure 313 to retrieve predetermined selection criteria configured for mainframe 101. As discussed above, in some implementations, mainframe 101 receives mainframe data from multiple mainframes. Thus, in some instances, CSF engine determines a mainframe identifier (e.g., identifier of mainframe 101A, 101B, or 101C shown in FIG. 2) associated with SMF data 801 and sends request 803 using the determined mainframe identifiers as parameters. In such a case, predetermined selection criteria retrieved at 805 can vary depending on the mainframe identified in request 803. Stated differently, control data structure 313 can store different predetermined selection criteria for different mainframes. Next, control data structure 313 sends flattening criteria response 807.

At 809, CSF engine 302 extracts SMF records and field values from SMF data 801 based on received flattening criteria response 807. At 811, CSF engine 302 sends flattening snippets request 811 to flattening data structure 311. Flattening data structure 311 responds with a set of flattening code snippets with processor-executable instructions in flattening snippets response 812. Next, CSF engine 302 executes, at 813, one or more flattening code snippets to produce a flattened set with SMF records and/or field values in a targeted format. CSF engine 302 sends, at 815, the produced flattened set to data warehouses or repositories 109 such that the flattened set is inserted into a dataset residing in data warehouses or repositories 109. Some examples of data warehouses or repositories 109 are discussed above with reference to data warehouses 109A, 109B, and 109C in FIG. 1.

Figure 9:
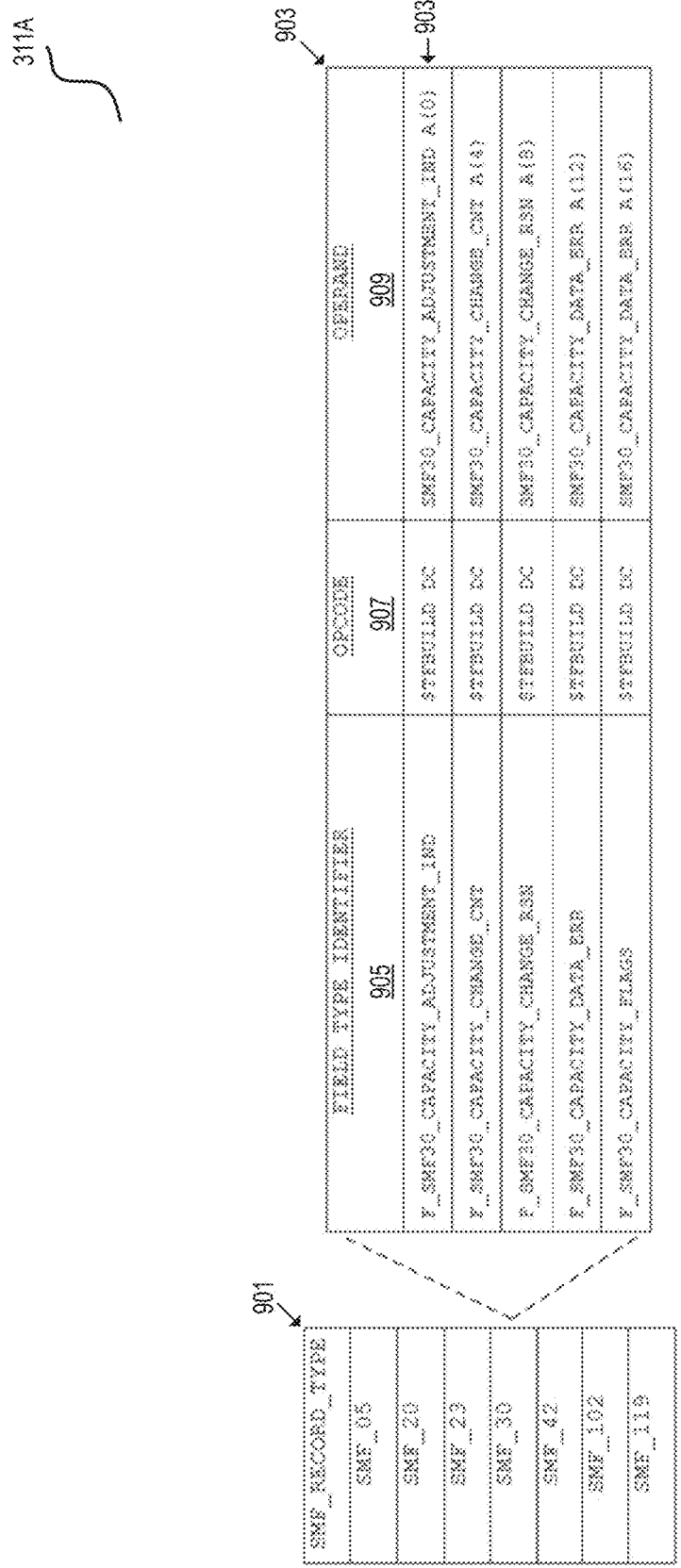
FIG. 9 is an example segment of a flattening data structure with indexed identifiers of system measurement facility record types, field-type identifiers, and parameters for selectively capture system measurement facility records, according to an embodiment.

An example of a segment of flattening data structure 309 is illustrated in FIG. 9. In some implementations, flattening data structure 309A includes processor-executable code and data to flatten SMF records and/or other mainframe OS records. The example illustrated in FIG. 9 shows an example configuration to flatten record-type SMF_30. In general, SMF_30 records consolidate data that is found in record types SMF_4, SMF_5, SMF_20, SMF_34, SMF_35, and SMF_40 providing additional information such as, indications for when a task or job has been started and completed, CPU times, termination status, and other mainframe suitable data. Flattening data structure segments such as segment 309A have a synchronized counterpart segment in control data structure 313 discussed below with reference to FIG. 10.

In some implementations, flattening data structure segment 311A includes a SMF_RECORD_TYPE vector 901 with SMF record-type identifiers. Each record-type identifier is logically related to a segment of a field-type data structure. For instance, SMF record-type SMF_30 is logically related to segment of field-type data structure 903. Likewise, the rest of the record-type identifiers in SMF_RECORD_TYPE vector 901 are logically related to other segments of field-type data structures (not shown in FIG. 9).

In this instance, segment 903 includes a list of field-type identifiers arranged in a named index vector 905. SMF record-types are composed by a set of field-types, each field-type related to a SMF data type. For instance, field-type identifiers listed in named index vector 905 are part of SMF_30 record-type. Opcode list 907 specify macros, used in the instantiation and synchronization of flattening data structure 311A and control data structure 313. In this embodiment, $TFBUILD macros are used however, other suitable macros can be similarly employed.

In some instances (e.g., during initialization of a flattening data structure), $TSFBUILD macros construct a labeled word entry with an index value for each field-type identifier in the named index vector 905 using an operand from operand list 909. For instance, upon instantiation of flattening data structure 311A, $TSBUILD macros can produce an indexed value pointing to a memory location labeled as F_SMF30_CAPACITY_ADJUSTMENT_IND A(0) shown in row 903A. In some implementations, indexed values serve as a placeholder for an address pointing to memory locations where address vector 1005 resides in control data structure 313A (shown in FIG. 10). In some alternative implementations, the indexed value can serve as a placeholder for an address pointing to a memory location of a flattening criteria segment e.g., segment 1007A in control data structure 313A (also shown in FIG. 10).

Figure 10:
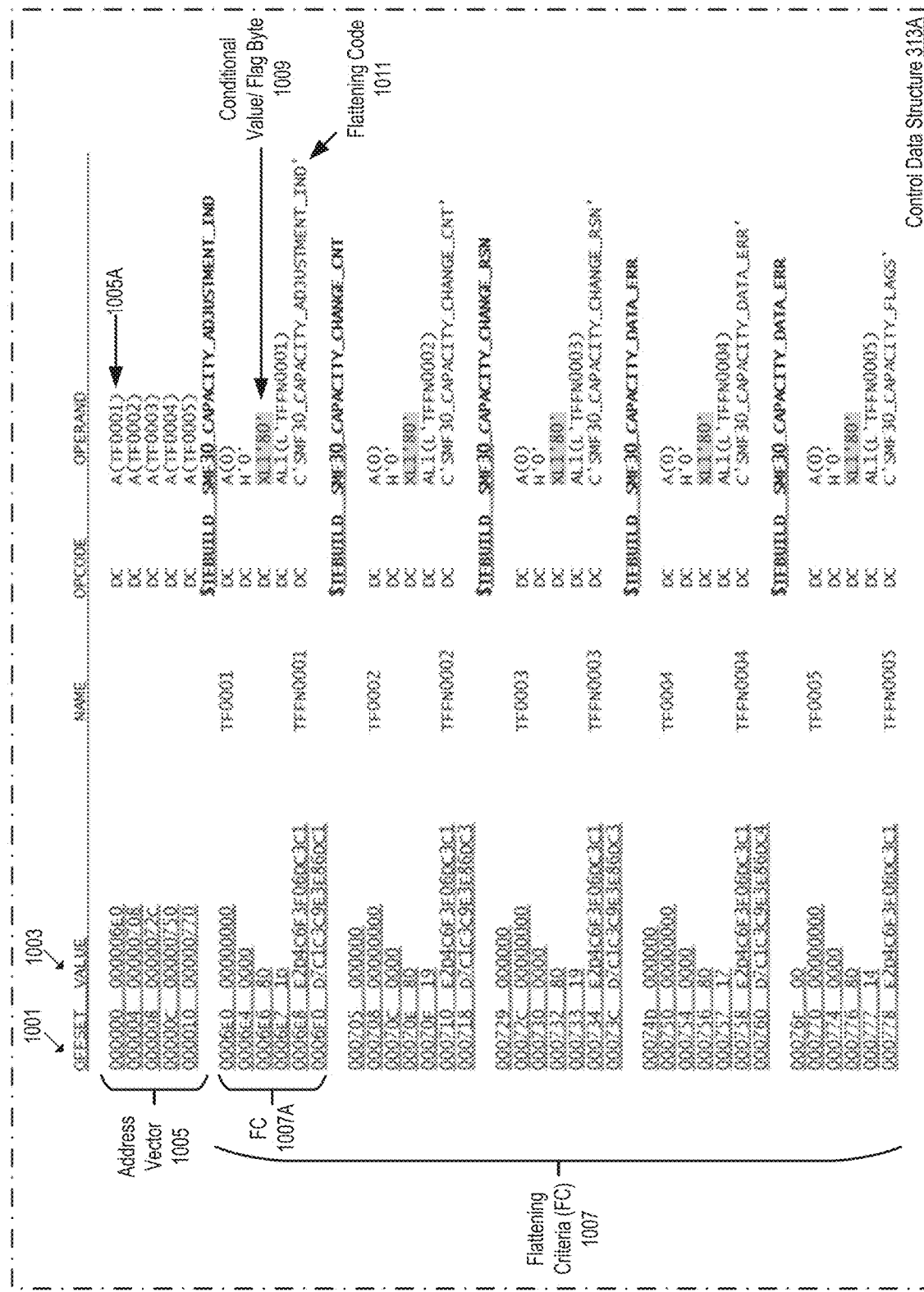
FIG. 10 is an example of a control data structure including a logic flow control structure, and criteria for selectively capture system measurement facility records, according to an embodiment.

An example of a segment of control data structure 213A is illustrated in FIG. 10. In some instances (e.g., during initialization of control data structure), $TSBUILD macros construct an address vector 1005. Address vector 1005 is an address vector or logic flow structure including offset values 1001 and relative address values 1003. Address vector 1005 is synchronized with named index vector 905 in FIG. 9. Each element in named index vector 905 has a counterpart in address vector 1005. For instance, address vector elements on row 1005A, include an effective memory address defined by relative memory address value 000006E0 and offset 000000. Such an effective memory address is a counterpart of labeled word entry with index value F_SMF30_CAPACITY_ADJUSTMENT_IND A(0) shown in row 903A in FIG. 9.

Effective memory addresses are determined from paired elements shown in offset column 1001 and relative address value column 1003. Effective addresses determined from address vector 1005 point to segments of code residing in flattening criteria 1007. In this instance, an effective memory address calculated by the addition of relative address 000006E0 and offset 000000 shown in row 1005A points to the beginning of flattening criteria segment 1007A. Flattening criteria segment 1007A includes conditional value or flag byte 1009 indicating if field values of the field-type SMF30_CAPACITY_ADJUSTMENT_IND are configured to be flattened. Flattening criteria segment 1007A also includes a pointer 1011 indicating a memory location for processor executable instruction to flatten field values of field-type SMF_30_CAPACITY_ADJUSTMENT_IND. In some instances, field values of the field-type SMF_30_CAPACITY_ADJUSTMENT_IND are flattened upon a determination that conditional value or flag byte 1015 indicates a flattening instruction.

In some implementations, mainframe 101 maintains synchronization between named indexed vector 905 (shown in FIG. 9) and counterpart data structures (e.g., paired offset and relative address values in address vector 1005) via copybook data structures or other suitable data structure (not shown in FIG. 10). Such a copybook data structure can be instantiated in central storage 309 (FIG. 3) to store and maintain processor-executable code and data values that can be used by multiple processes (e.g., multiple $TFBUILD macros) to ensure synchronization between flattening data structure 311 and control data structure 313. For instance, macros executed from flattening data structure 311 and control data structure 313 can access data from a same copybook data structure.

In some instances, each field-type identifier in named indexed vector 905 can be logically related to a copybook data structure. Accordingly, $TFBUILD macros can access copybook data structures to determine if, for example, a field-type identifier included in flattening data structure 311 has counterpart entries in control data structure 313; if there is no counterpart entry, then the macros produce counterpart entries in control data structure 313 to ensure synchronization. In other instances, $TFBUILDER macros can access copybook data structures to determine if entries in control data structure 313 (e.g., address vector 1005 and/or segment in flattening criteria 1007) have a counterpart field-type identifier in named indexed vector 905 (FIG. 9). If there are no counterparts, $TFBUILD macros produce counterpart entries in flattening data structure 311 to ensure synchronization. Alternatively or additionally, $TFBUILD or other suitable macros can remove entries in flattening data structure 311 and control data structure 313 based on copybook data structures as needed to ensure synchronization.

In some implementations, flattening data structure 311 and control data structure 313 are linked or logically related by a composite field. Such a composite field includes a record-type and/or subtype identifier and a field-type identifier. For instance, a composite field in segment of flattening data structure 311A is defined by record-type SMF_30 and field-type SMF_30_CAPACITY_ADJUSTMENT_IND an analogous counterpart for such a composite field is maintained in control data structure 313.

Conditional values or flag bytes such as 1009 can be configured to indicate a flattening instruction or a non-flattening instruction during or after instantiation of control data structure 313. For instance, mainframe 101 can receive via an input connector 317 (shown in FIG. 3) a configuration input file with values for conditional value or flag byte 1009 and/or other conditional values in flattening criteria 1007. As discussed above, conditional values in flattening criteria 1007 can specify different flattening instructions for different mainframes. For instance, in some implementations, SF server 205 can be configured to select and flattened a set of SMF field-types from SMF data received or captured from mainframe 201A (in FIG. 2) and a different set of SMF field-types from SMF data received or captured from mainframe 201B (also shown in FIG. 2). Conditional values or flag bytes can be updated or reconfigured at any time after instantiation of flattening data structure 311 and control data structure 313 through, for instance, submitting a conditional values configuration file, user input via a graphical user interface or other suitable techniques.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. A method comprising:
   receiving, at a compute device, a collected set of system measurement facility (SMF) data, the collected set of SMF data associated with a mainframe operating system, the collected set of SMF data received at a rate that, on aggregate, the SMF data is produced by the mainframe operating system, each record from the collected set of SMF data having a record-type identifier and containing a plurality of SMF field values, each SMF field value from the plurality of SMF field values associated with a SMF field-type identifier;
   retrieving from a memory operatively coupled to the compute device, a set of SMF field-type identifiers, each SMF field-type identifier from the set of SMF field-type identifiers having a one-to-one logical relation with a conditional value from a set of conditional values such that each conditional value from the set of conditional values identifies, by SMF field-type identifier, records to be flattened;
   selecting a set of SMF field values from each record from the collected set of SMF data associated with a SMF field-type identifier that the set of conditional values indicate are to be flattened;
   executing, for each SMF field value from the set of SMF field values, a flattening data structure linked to a SMF field-type identifier over the set of SMF field values to produce a flattened record that includes at least one flattened SMF field value converted into a target format; and
   inserting the flattened record into a data repository compatible with the target format.

2. The method of claim 1, further comprising:
   parsing each record from the collected set of SMF data to determine a set of SMF record-type identifiers, each SMF record-type identifier from the set of SMF record-type identifiers logically related to at least one SMF field-type identifier, the set of SMF field-type identifiers retrieved from memory based, at least in part, on the determined set of SMF record-type identifiers.

3. The method of claim 1, wherein selecting the set of SMF field values, includes:
   selecting an identified SMF field value from the collected set of SMF data, upon (a) a determination that the identified SMF field value belongs to a class of SMF fields specified by a SMF field-type identifier from the set of SMF field-type identifiers, and (b) a determination that the SMF field-type identifier has a one-to-one logical relation with a conditional value indicative of a flatten instruction; and
   including the identified SMF field value in the set of SMF field values.

4. The method of claim 1, wherein selecting a set of SMF field values includes:
   selecting a SMF record from the collected set SMF data, the SMF record logically related to a SMF field-type identifier that is from the set of SMF field-type identifiers and that is linked to an identified SMF field value.

5. The method of claim 1, wherein:
   the flattened record includes at least one flattened SMF field identifier associated with the at least one flattened SMF field value included in the flattened record; and
   executing the flattening data structure includes determining at least one field identifier equivalency between the at least one flattened SMF field-type identifier and a set of field identifiers of the target format.

6. The method of claim 1, wherein executing the flattening data structure includes converting the set of SMF field values into a relational database format.

7. The method of claim 1, wherein executing the flattening data structure includes converting the set of SMF field values into a non-relational database format.

8. The method of claim 1, wherein the set of SMF field-type identifiers is a first set of SMF field-type identifiers, the set of conditional values is a first set of conditional values, the set of SMF records are a first set of SMF records, the flattened record is a first flattened record, and the target format is a first target format, the method further comprising:
   retrieving from the memory, a second set of SMF field-type identifiers, each SMF field-type identifier from the second set of SMF field-type identifiers having a one-to-one logical relation with a conditional value from a second set of conditional values such that each conditional value from the second set of conditional values identifies records, by SMF field-type identifier, to be flattened, the second set of conditional values differing from the first set of conditional values such that at least one SMF-field-type identifier identified to be flattened by the first set of conditional values is indicated as not to be flattened by the second set of conditional values;
   selecting a second set of SMF field values from each record from the collected set of SMF data associated with a field-type identifier that the second set of conditional values indicate are to be flattened;
   executing, for each SMF field value from the second set of SMF field values, a flattening data structure linked to a field type-identifier over the second set of SMF field values to produce a second flattened record that includes at least one flattened SMF field value converted to a second target format; and inserting the second flattened record into the data repository.

9. A non-transitory computer-readable medium comprising code which, when
   executed by a processor, cause the processor to:
   instantiate in a memory operatively coupled to the processor, a control data structure including a set of predetermined criteria specifying whether or not a system measurement facility (SMF) field value is designated to be flattened based on a SMF field-type identifier associated with that SMF field value;
   instantiate in the memory, a flattener data structure including a set of SMF record-type identifiers, each SMF record-type identifier from the set of SMF record-type identifiers is linked to at least one SMF field-type identifier, each of the at least one SMF field-type identifier being logically related to flattening code snippet;
   receive a collected set of SMF data, the collected set of SMF data associated with a mainframe operating system, the collected set of SMF data received at a rate that, on aggregate, the SMF data is produced by the mainframe operating system, each record from the collected set of SMF data having a record-type identifier and containing a plurality of SMF field values, each SMF field value from the plurality of SMF field values associated with a SMF field-type identifier;
   select a set of SMF field values from the collected set of SMF data, the set of SMF field values selected based on the set of predetermined criteria included in the control data structure;
   execute, for each SMF field value from the set of SMF field values, at least one flattening code snippet from the flattener data structure to produce a flattened record that includes at least one flattened SMF field value converted into a target format; and
   insert the flattened record into a data repository compatible with the target format.

10. The non-transitory computer-readable medium of claim 9, wherein the set of SMF record-type identifiers is a first set of SMF record-type identifiers, the non-transitory computer-readable medium further causes the processor to:
    initialize the control data structure with a second set of SMF record-type identifiers, each SMF record-type identifier from the second set of SMF record-type identifiers linked to at least one SMF field-type identifier; and
    assign a conditional value to each of the at least one SMF field-type identifier linked to each SMF record-type identifier from the second set of SMF record-type identifiers, the conditional value indicating whether or not a class of SMF field values are conditioned to be included in the set of SMF field values.

11. The non-transitory computer-readable medium of claim 9, wherein the set of SMF record-type identifiers is a first set of SMF record-type identifiers, the non-transitory computer-readable medium further causes the processor to:
    receive a configuration file including a second set of SMF record-type identifiers, each SMF record-type identifier from the second set of SMF record-type identifiers specifying a logical relation to at least one SMF field-type identifier, each of the at least one SMF field-type identifier having a conditional value specifying whether or not, a class of SMF field values are conditioned to be included in the target SMF data subset; and
    update the set of predetermined criteria based on the configuration file.

12. The non-transitory computer-readable medium of claim 9, wherein the set of SMF record-type identifiers is a first set of SMF record-type identifiers, the non-transitory computer-readable medium further causes the processor to:
    initialize the control data structure with a second set of SMF record-type identifiers;
    establish a set of logical relations including a logical relation between each SMF record-type identifier from the second set of SMF record-type identifiers and a SMF record-type identifier from the first set of SMF record-type identifiers; and
    select for execution, at least one flattening code snippet from the flattener data structure based, at least in part, on the set of logical relations.

13. An apparatus, comprising:
    a processor; and
    a memory storing code which, when executed by the processor, causes the processors to:
    instantiate a control data structure and a flattening data structure, the control data structure and the flattening data structure linked to one another via a composite field, the composite field includes a system measurement facility (SMF) record-type identifier and a SMF field-type identifier;
    receive a collected set of SMF data associated with a mainframe operating system, the collected set of SMF data received at a rate that, on aggregate, the SMF data is produced by the mainframe operating system, each record from the collected set of SMF data having a record-type identifier and containing a plurality of SMF field values, each SMF field value from the plurality of SMF field values associated with a SMF field-type identifier;
    select a set of SMF field values from the collected set of SMF data, the set of SMF field values selected based on a predetermined criteria configured in the control data structure;
    execute, for each SMF field value from the set of SMF field values, a flattening process to produce a flattened record with set of SMF field values converted to a target format; and
    send the flattened record to a compute device.

14. The apparatus of claim 13, wherein the code to instantiate the flattening data structure includes code to:
    initialize the flattening data structure with a set of SMF record-type identifiers, each SMF record-type identifier from the set of SMF record-type identifier linked to at least one SMF field-type identifier, each of the at least one SMF field-type identifier linked to a flattening code snippet to flatten a class of SMF field values.

15. The apparatus of claim 13, wherein the code to instantiate the control data structure includes code to:
    initialize the control data structure with a set of SMF record-type identifiers, each SMF record-type identifier from the set of SMF record-type identifier linked to at least one SMF field-type identifiers, each of the at least one SMF field-type identifier linked to a conditional value specifying whether or not a class of SMF field values is set to be flattened.

16. The apparatus of claim 13, wherein the code to select the set of SMF field values includes code to:
    parse the collected set of SMF data to determine a set of SMF record-type identifiers, each SMF record-type identifier from the set of SMF record-type identifiers logically related to at least one SMF field-type identifier;

retrieve a set of SMF field-type identifiers from the control data structure, each SMF field-type identifier from the set of SMF field-type identifier linked to a conditional value specifying whether or not a SMF field value is set to be flattened; and extract the set of SMF field values from the collected set of SMF data based, at least in part, on the set of SMF field-type identifiers.

17. The apparatus of claim 13, wherein the code to select the set of SMF field values includes code to:

extract an identified SMF field value from the collected set of SMF data, upon a) a determination that the identified SMF field value belongs to a class of SMF fields specified by a SMF field-type identifier from a set of SMF field-type identifiers included in the predetermined criteria, and b) a determination that the SMF field-type identifier has a one-to-one relation with a conditional value indicative of a flatten instruction.

18. The apparatus of claim 13, wherein the composite field is a first composite field, the code to execute the flattening process includes code to:

execute at least one flattening code snippet selected from a plurality of flattening code snippets included in the flattening data structure, each of the at least one flattening code snippet is linked to a second composite field including a SMF record-type identifier and a SMF field-type identifier, the second composite field linked to a third composite field in the control data structure, the third composite field linked to a conditional value indicative of a flatten instruction.

19. The apparatus of claim 13, wherein the set of SMF field values is a first target subset, the predetermined criteria is a first predetermined criteria, the target format is a first target format, the flattened record is a first flattened record, the code further causes the processor to:

select a second target subset from the collected set of SMF data, the second target subset selected based on a second predetermined criteria configured in the control data structure;

execute the flattening process over the second target subset to produce a second flattened record with SMF data converted to a second target format; and send the second flattened record to the compute device.

* * * * *